United States Patent
Maxwell et al.

[15] 3,646,484

[45] Feb. 29, 1972

[54] DIODE-SWITCHED RF ATTENUATOR

[72] Inventors: Donald E. Maxwell, Syracuse; Roger W. Mazzochi, Solvay, both of N.Y.

[73] Assignee: The United States of America as represented by the Secretary of the Army

[22] Filed: July 8, 1970

[21] Appl. No.: 53,149

[52] U.S. Cl. ....................333/81 R, 307/242, 333/7

[51] Int. Cl. ....................H01p 1/22

[58] Field of Search..............333/7, 81, 81 A; 307/241, 242; 323/74, 80, 81

[56] References Cited

UNITED STATES PATENTS 2,782,307 2/1957 Von Sivers et al. ..................333/81 X

*Primary Examiner*—Herman Karl Saalbach
*Assistant Examiner*—Paul L. Gensler
*Attorney*—Charles K. Wright, Jr., William G. Gapcynski, Lawrence A. Neureither, Leonard Flank, Aubrey J. Dunn and Jack W. Voigt

[57] ABSTRACT

Bypass and attenuation paths are provided through respectively switched diodes. The diodes in the bypass path are turned on in response to direct current of one polarity, and off in response to the opposite polarity, and conversely for the diodes in the attenuate path. Filters are provided to exclude direct current from the bypass and attenuation paths, and to exclude RF from the source of direct current. Equalizers and compensators associated with each path allow phase-shift and attenuation to be accurately adjusted.

2 Claims, 1 Drawing Figure

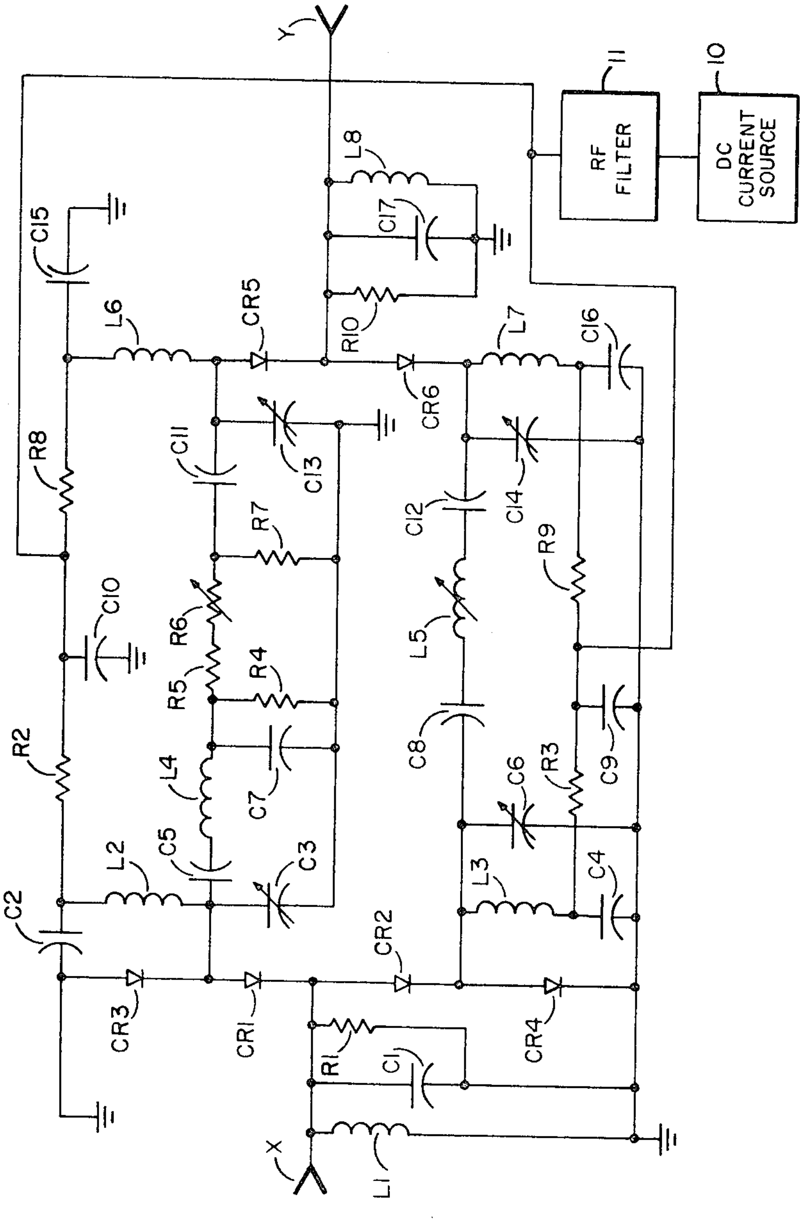
Donald E. Maxwell
Roger W. Mazzochi,
INVENTORS.
Jack W. Voigt
BY Aubrey J. Dunn

DIODE-SWITCHED RF ATTENUATOR

BACKGROUND OF THE INVENTION

There are various known schemes for attenuation of RF signals. All of these schemes include dissipative elements such as resistors, with various means for switching the resistors in series or parallel with the RF signal path. Mechanical switches may be used, but have problems such as slow operating times, variable contact resistances and capacitances, etc. Electron control devices such as transistors and vacuum tubes have problems of slow operating times and undesirable phase shifts at higher radiofrequencies. The instant invention is able to avoid these prior problems. Attenuators constructed in accordance with the teaching of the instant invention may be cascaded with vary small variations in phase-shift with any combination of bypass and attenuate conditions. Specifically, for a cascade connection of seven attenuators, switching can be accomplished in approximately 2 microseconds over a very wide frequency band. For this cascade configuration, a time delay of less than 3.7 picoseconds exists between the bypass and attenuate conditions. At a frequency of 75 MHz. (which is the design center frequency for the inventive attenuator), the time delay difference for seven cascaded attenuators corresponds to a phase difference of less than ±0.1°. The 1-db.-down limits occur at about 3 MHz. on the low end, and 300 MHz. on the high end.

SUMMARY OF THE INVENTION

A diode-switched RF attenuator is shown including a bypass path and an attenuating path. Each path includes oppositely poled series-connected diodes, and the attenuation path additionally includes attenuating resistors. The diodes in the paths are selectively turned on and off in response to the direction of a DC switching current, to provide conduction through either the bypass path or the attenuation path. Various filters isolate the DC current from the paths, and isolate the RF from the source of DC current. Equalizing elements in each path allow overall phase-shift through the paths to be accurately adjusted, and compensators allow input-output impedances to be accurately controlled.

BRIEF DESCRIPTION OF THE DRAWING

The single drawing FIGURE is a schematic diagram of the invention.

DESCRIPTION OF THE PREFERRED EMBODIMENT

The drawing shows an attenuator capable of 12-db. attenuation at a nominal frequency of 75 MHz., for the circuit components hereinafter listed. This attenuator is bidirectional and includes input-output terminals *x* and *y*. A bypass path is provided between terminals *x* and *y* includes diode CR2, capacitor C8, inductor L5, capacitor CL2, and diode CR6. The attenuate path includes diode CR1, capacitor C5, inductor L4, resistors R4–R7, capacitor C11, and diode CR5. Diodes CR3 and CR4 are shunt diodes provided to aid in switching of the other diodes and reduce RF leakage. The various diodes are either on or off depending on whether bypass or attenuation is desired. Switching of the diodes is accomplished by DC current source 10, feeding through RF blocking filter 11. The current from 10 is divided among the various diodes by resistors R2, R3, R8, and R9. For one direction of current from 10, diodes CR2, CR6, and CR3 will be on, and diodes CR1, CR5, and CR4 will be off and reversed-biased by the forward current of the on diodes. In this state, the RF signal will flow through the bypass path of the attenuator with the relatively small insertion loss of 0.7 db., for the specific components listed hereinafter. Inductors L1–L3 and L6–L8 pass the DC current from 10 to the diodes, but act as chokes to the RF, and exclude the RF from the DC paths. Variable capacitors C3 and C13 are provided for impedance matching purposes. Capacitors C1 and C17 are input impedance compensators. Resistors R1 and R10 provide impedance matching for the diode internal resistances. Capacitors C5, C11 and C8, C12 respectively block DC from the attenuate and bypass paths. Variable inductor L5, together with capacitors C6 and C14, forms a pi-section of lumped-constant transmission line. This line provides time-delay equalization. Resistors R4–R7 comprise the basic attenuator. Variable resistor R6 permits adjustment of attenuation to the exact desired value. L4 and C7 are used as phase compensators, and various values thereof are used for different db. values. Capacitors C2, C4, C9, C10, C15, and C16 are additional filters to exclude RF from source 10.

Typical values of the various components of the drawing are given below.

| Component(s) | Value | Units |
|---|---|---|
| R1, R10 | 1200 | ohms |
| R2, R3, R8, R9 | 40.2 | do. |
| R4, R5, R7 | 83.5 | do. |
| R6 | 0–20 | do. |
| C1, C17 | 3.1 | picofarads |
| C2, C4, C9, C10, C15, C16 | 680 | do. |
| C3, C6, C13, C14 | 2–8 | do. |
| C5, C8, C11, C12 | 1500 | do. |
| C7 | 0 | do. |
| L1, L2, L3, L6, L8 | 10 | microhenries |
| L4 | 7.5 | nanohenries |
| L5 | 0.012–0.018 | microhenries |

Diodes Cr1–CR6 may be General Electric type IN606, in which case the current provided by source 10 is ±150 ma. The impedance at each of *x* and *y* is 50 ohms. The invention may take the form of a printed a printed circuit in a shielded enclosure, with proper connections through the inclosure. It should be understood that source 10 may be switched in polarity in response to an external logic (not shown).

While a specific embodiment of the invention has been shown and described, other embodiments may be obvious to ones skilled in the art, in light of this invention.

We claim:

1. An RF device switchable between attenuate and bypass conditions comprising: a bypass path including first and second series-connected oppositely poled diodes; an attenuate path including the series connection of resistance means and third and fourth oppositely poled diodes; wherein said resistance means comprises a pi-section including a first fixed and a variable resistor in series with said path, and further fixed resistors connected between the ends of said first fixed and said variable resistor and ground; means for providing either polarity of DC current connected to each of said diodes; first and second input-output terminals; said paths being connected in parallel between said terminals, wherein opposite poles of said first and third diodes are connected to said first terminal, and opposite poles of said second and fourth diodes are connected to said second terminal, and said means for providing is connected to the poles of said diodes not connected to said terminals, fifth and sixth diodes connected between ground and the respective poles of said first and third diodes not connected to said terminals, whereby when said fifth diode is conducting current from said means for providing, said first diode is held nonconducting, and when said sixth diode is conducting current from said means for providing, said third diode is held nonconducting; wherein said first, second, and sixth diodes all conduct for one polarity of current from said means for providing, and said third, fourth, and fifth diodes all conduct for the opposite polarity of current from said means for providing.

2. The device as set forth in claim 1 wherein each of said paths includes DC blocking means therein and impedance adjusting means.

* * * * *